(12) United States Patent
Smith et al.

(10) Patent No.: US 11,705,632 B2
(45) Date of Patent: Jul. 18, 2023

(54) SYMPHOTIC STRUCTURES

(71) Applicant: DUKE UNIVERSITY, Durham, NC (US)

(72) Inventors: David R. Smith, Durham, NC (US);
Guillermo Sapiro, Durham, NC (US);
Daniel L. Marks, Durham, NC (US);
Patrick Bowen, Durham, NC (US);
Roberto Zecca, Durham, NC (US);
Okan Yurduseven, Altadena, CA (US);
Jonah N. Gollub, Durham, NC (US)

( * ) Notice: Subject to any disclaimer, the term of this patent is extended or adjusted under 35 U.S.C. 154(b) by 908 days.

(21) Appl. No.: 16/138,961

(22) Filed: Sep. 21, 2018

(65) Prior Publication Data
US 2019/0109379 A1 Apr. 11, 2019

Related U.S. Application Data

(60) Provisional application No. 62/562,547, filed on Sep. 25, 2017, provisional application No. 62/561,918, filed on Sep. 22, 2017.

(51) Int. Cl.
*H01Q 15/10* (2006.01)
*H01Q 21/06* (2006.01)
(Continued)

(52) U.S. Cl.
CPC ............. *H01Q 5/22* (2015.01); *G03H 1/0005* (2013.01); *G03H 1/0248* (2013.01);
(Continued)

(58) Field of Classification Search
CPC .. H01Q 5/22; H01Q 15/0033; H01Q 15/0046; H01Q 15/02; H01Q 15/002;
(Continued)

(56) References Cited

U.S. PATENT DOCUMENTS 10,660,531 B1 * 5/2020 Libove ................. A61B 5/7225
2012/0194399 A1 * 8/2012 Bily .................... H01Q 15/0006
343/772

(Continued)

OTHER PUBLICATIONS

Marks, Daniel L. et al., Linear Solutions to Metamaterial Volume Hologram Design Using a Variational Approach, Journal of the Optical Society of America, Mar. 14, 2018.
(Continued)

*Primary Examiner* — Hai V Tran
*Assistant Examiner* — Michael M Bouizza
(74) *Attorney, Agent, or Firm* — PCFB, LLC; Justin K. Flanagan

(57) ABSTRACT

Systems and methods for designing, optimizing, patterning, forming, and manufacturing symphotic structures are described herein. A symphotic structure may be formed by identifying a continuous refractive index distribution calculated to convert each of a plurality of input reference waves to a corresponding plurality of output object waves. The continuous refractive index distribution can be modeled as a plurality of subwavelength voxels. The system can calculate a symphotic pattern as a three-dimensional array of discrete dipole values to functionally approximate the subwavelength voxels. A symphotic structure may be formed with a volumetric distribution of dipole structures. A dipole value, such as a dipole moment (direction and magnitude) of each dipole is selected for the volumetric distribution to convert a plurality of input reference waves to a target plurality of output object waves.

21 Claims, 11 Drawing Sheets

(51) Int. Cl.
*H01Q 5/22* (2015.01)
*G03H 1/02* (2006.01)
*G03H 1/00* (2006.01)
*H01Q 15/00* (2006.01)
*H01Q 15/02* (2006.01)
*G03H 1/08* (2006.01)

(52) U.S. Cl.
CPC ......... *G03H 1/0808* (2013.01); *G03H 1/0891* (2013.01); *H01Q 15/002* (2013.01); *H01Q 15/0026* (2013.01); *H01Q 15/0033* (2013.01); *H01Q 15/0046* (2013.01); *H01Q 15/02* (2013.01); *H01Q 15/10* (2013.01); *H01Q 21/06* (2013.01)

(58) Field of Classification Search
CPC .... H01Q 15/10; H01Q 15/0026; H01Q 21/06; G03H 1/0891; G03H 1/0808; G03H 1/0248; G03H 1/0005
See application file for complete search history.

(56) References Cited

U.S. PATENT DOCUMENTS

2013/0016432 A1* 1/2013 Liu .................. H01Q 15/02
 359/618
2016/0204515 A1* 7/2016 Smith ................ H01Q 13/28
 343/772
2017/0003389 A1* 1/2017 Brady ................ H01Q 3/24

OTHER PUBLICATIONS

Marks, Daniel L. et al., Linear Solutions to the Design of Multiplex Volume Holograms, Journal of the Optical Society of America, Sep. 3, 2017.

* cited by examiner

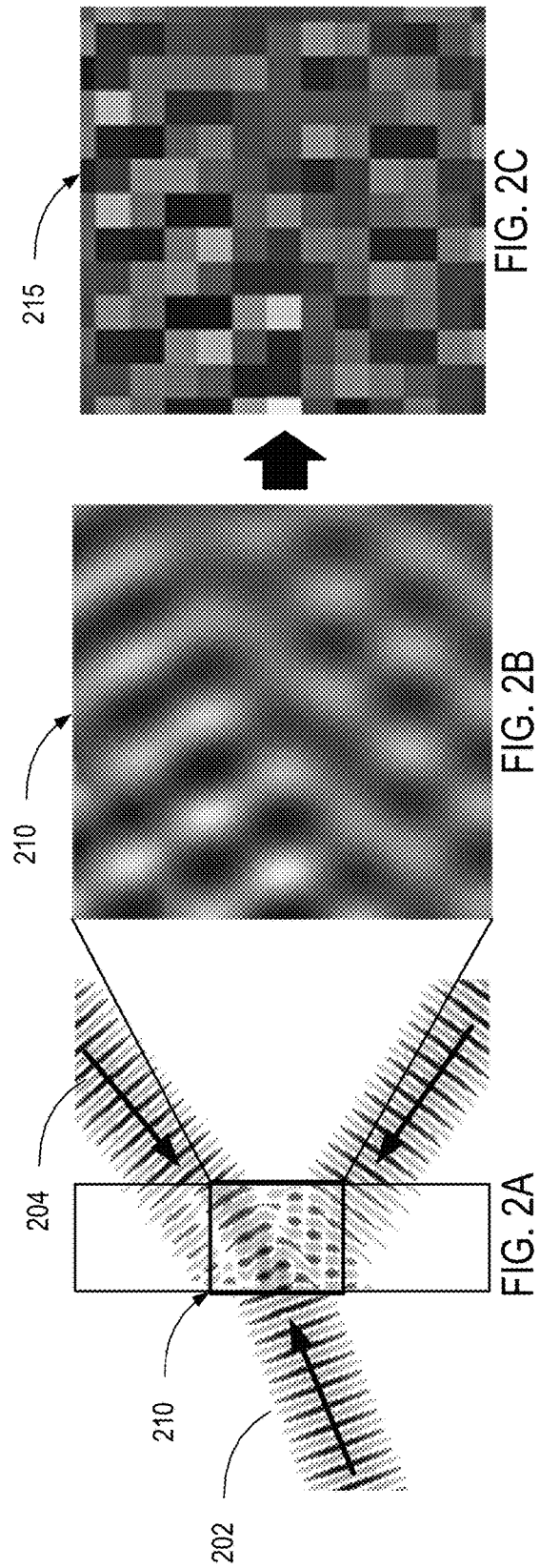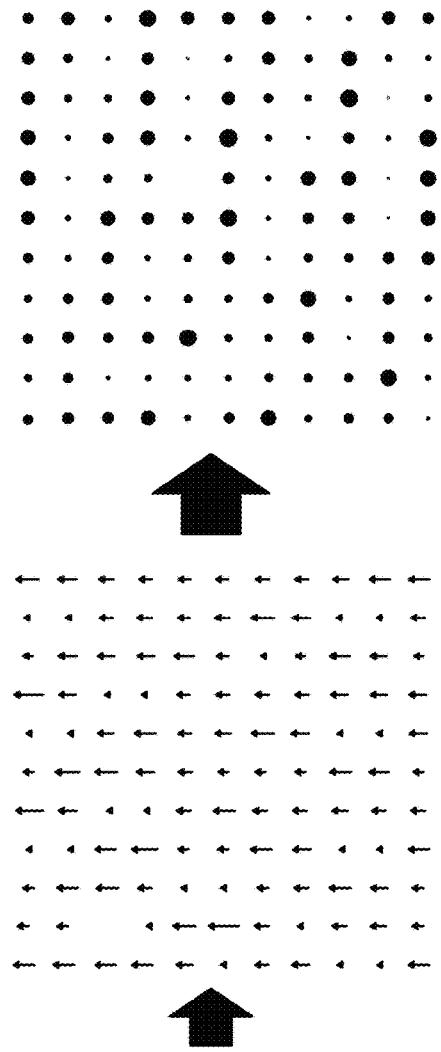

E = Electric Field
H = Magnetic Field
K = Incidence

| Material | Spectral Range, μm | Refractive Index, n |
|---|---|---|
| c-Si | 0.50-1.45 | 4.293-3.486 |
|  | 1.45-2.40 | 3.484-3.437 |
| a-Si | 0.50-1.00 | 4.47-3.61 |
| GaAs | 0.50-0.80 | 4.037-3.679 |
| GaP | 0.50-0.80 | 3.590-3.197 |
| InP | 0.50-0.80 | 3.456-3.818 |
| $TiO_2$ | 0.50-1.00 | 2.715-2.483 |
| Ge | 0.50-0.60 | 4.460-5.811 |
|  | 0.60-0.80 | 5.811-4.699 |
|  | 0.80-1.90 | 4.684-4.129 |
|  | 1.90-2.40 | 4.111-4.069 |
| GaSb | 1.00-2.40 | 4.140-3.846 |
| Te | 4.00-14.0 | 4.929-4.785 |
| PbTe | 4.10-12.5 | 5.975-5.609 |
| GeTe | 6.20-11.8 | 7.3-7.278 |
| SiC | 11.0-15.0 | ~20 |

FIG. 6

SYMPHOTIC STRUCTURES

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc., applications of such applications are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 U.S.C. § 119(e) for provisional patent applications, for any and all parent, grandparent, great-grandparent, etc., applications of the Priority Application(s)). In addition, the present application is related to the "Related Applications," if any, listed below.

PRIORITY APPLICATIONS

This application claims priority under 35 U.S.C. § 119(e) to U.S. Provisional Patent Application No. 62/561,918, filed on Sep. 22, 2017, titled "Data-Driven Holographic Metamaterials for Optical Storage, Adaptive Objects and Acoustics", and U.S. Provisional Patent Application No. 62/562,547, filed on Sep. 25, 2017, titled "Data-Driven Holographic Metamaterials for Optical Storage, Adaptive Objects and Acoustics", both of which are hereby incorporated by reference in their entireties. Moreover, all publications, texts, papers, appendices, and other materials cited within the above-identified provisional applications is hereby incorporated by reference, to the extent such subject matter is not inconsistent herewith.

RELATED APPLICATIONS

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc., applications of the Priority Applications and the Related Applications, including any priority claims, is incorporated herein by reference to the extent such subject matter is not inconsistent herewith.

TECHNICAL FIELD

This disclosure relates to volumetric index distributions for converting a set of input waves into a corresponding set of output waves. More specifically, this disclosure relates to static and reconfigurable finite three-dimensional arrays of conceptually polarizable subwavelength elements that can be optimized to functionally approximate continuous index distributions.

BRIEF DESCRIPTION OF THE DRAWINGS

Non-limiting and non-exhaustive embodiments of the disclosure are described herein, including various embodiments of the disclosure with reference to the figures listed below.

FIG. 2A illustrates a reference wave and an object wave interfering to create an interference pattern for determining an ideal hologram, according to one embodiment.

FIG. 2B illustrates an ideal hologram as a spatially varying refractive index distribution, according to one embodiment.

FIG. 2C illustrates the continuous, inhomogeneous material distribution of the ideal hologram discretized into a plurality of volume sub-elements, or voxels, according to one embodiment.

FIG. 2D illustrates the calculation of a symphotic pattern of dipole values that functionally approximates the volumetric subwavelength voxels, according to one embodiment.

FIG. 2E illustrates the ultimate realization of the symphotic pattern of dipole values formed as one or more metamaterial elements and/or dielectric particles, according to one embodiment.

FIG. 6 illustrates several materials that can be used to fabricate symphotic structures, spectral ranges, and refractive indices, according to one embodiment.

DETAILED DESCRIPTION

Figure 1A:
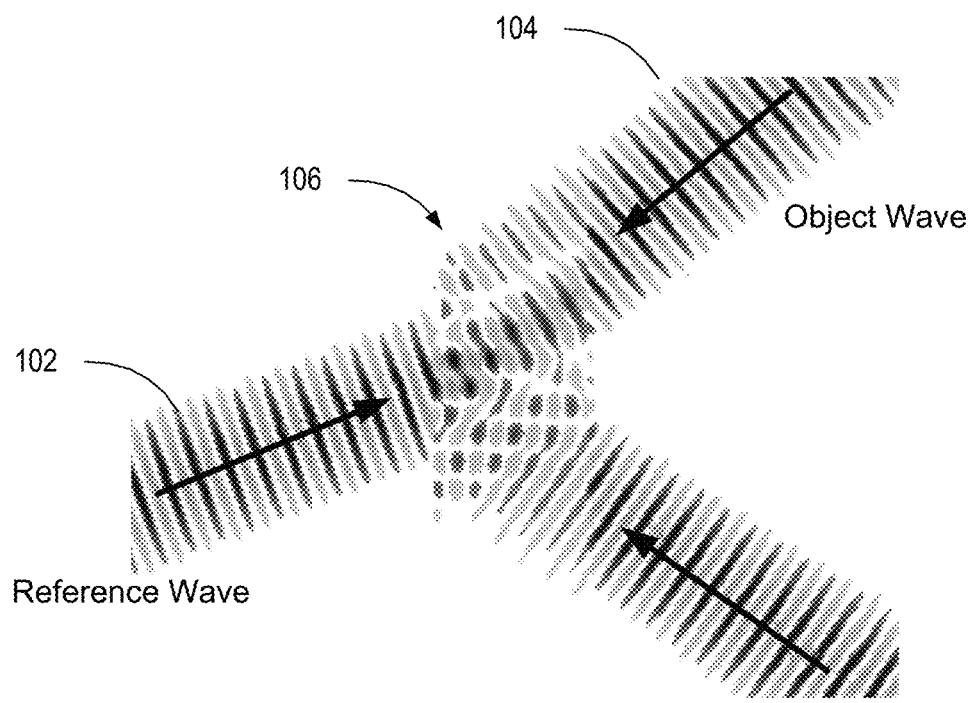
FIG. 1A illustrates a reference wave and an object wave interfering to create an interference pattern, according to one embodiment.

This disclosure includes various systems, apparatuses and methods that relate to modeling, optimizing, constructing, and dynamically tuning functional approximations of continuous volumetric index distributions for converting a set of input waves into a set of output waves. This disclosure builds on the basic understanding that a volumetric index distribution can produce a set of distinct output spatial wave patterns in response to a set of input waves that vary in incidence angle and/or frequency. The material(s) selection for the volumetric structure depends on the desired bandwidth and wave type.

For example, a volumetric distribution of dielectric resonators can provide a strong scattering response with minimal resistive losses for infrared and visible wavelengths of electromagnetic radiation. In contrast, metallic resonators may be suitable for spatial wave conversion at lower electromagnetic frequencies, such as microwave and millimeter wave frequencies. In fact, volumetric distributions of materials having various bulk moduli and densities can be used to convert a set of input acoustic waves to a determinable set of output acoustic waves. Structures may be generated with specific volumetric index distributions to enable highly parallelizable and ultrafast spatial wave processing. Systems and methods are described herein for designing, optimizing, and forming symphotic structures that include volumetric distributions of dipole structures. The interelement spacings may be subwavelength and a dipole value of each dipole structure may be selected so as to convert a plurality of input reference waves to a target plurality of output object waves.

Examples of discrete dipole approximations and modeling are described in U.S. Patent Publication 2016/0204515 titled "Discrete-Dipole Methods and Systems For Applications To Complementary Metamaterials," which is hereby incorporated by reference in its entirety. Various metamaterials and foundational principles thereof are described in U.S. Pat. No. 8,040,586 titled "Metamaterials," which is hereby incorporated by reference in its entirety. Scattering elements suitable for use by the presently described system and methods can include complementary metamaterial elements such as those presented in D. R. Smith et al, "Metamaterials for Surfaces and Waveguides," U.S. Patent Application Publication No. 2010/0156573, and A. Bily et al, "Surface Scattering Antennas," U.S. Patent Application Publication No. 2012/0194399, each of which is hereby incorporated by reference. Similarly, the scattering elements can include patch elements such as those presented in A. Bily et al, "Surface scattering antenna improvements," U.S. patent application Ser. No. 13/838,934, which is hereby incorporated by reference.

Metamaterial surface antennas, also known as surface scattering antennas, are described, for example, in U.S. Patent Application Publication No. 2012/0194399. Surface scattering antennas that include a waveguide coupled to a plurality of subwavelength patch elements are described in U.S. Patent Application Publication No. 2014/0266946. Surface scattering antennas that include a waveguide coupled to adjustable scattering elements loaded with lumped/active devices are described in U.S. Application Publication No. 2015/0318618. Surface scattering antennas that feature a curved surface are described in U.S. Patent Application Publication No. 2015/0318620. Surface scattering antennas that include a waveguide coupled to a plurality of adjustably-loaded slots are described in U.S. Patent Application Publication No. 2015/0380828. And various holographic modulation pattern approaches for surface scattering antennas are described in U.S. Patent Application Publication No. 2015/0372389. All of these patent applications include systems, methods, devices, approaches, and foundational material that can be used to form the symphotic structured described herein, and each of the above identified patent references is hereby incorporated by reference in its entirety.

Finally, U.S. Patent Pub. No. 2018/0241131 titled "Optical Surface Scattering Antennas" and all other patent applications claiming priority thereto or to which this publication claims priority are hereby incorporated by reference in their entireties. These applications discuss surface holographic technology involving a surface that is populated with a plurality of adjustable optical resonators. In some embodiments, symphotic structures, as described herein, may be implemented using adjustable optical resonators such as those described in these references.

The field of holography is related to the presently described systems and methods. In fact, many of the proposed solutions, applications, benefits, materials, and computational approaches developed for holography are applicable to the systems and methods described herein. However, holographic approaches for controlling waves rely on programming, calculating, or approximating an interference pattern. The holographic solution to converting an input wave to target output wave constitutes constructing an index modulation pattern that matches the interference pattern produced by the combination of the input wave and the target output wave.

In the ideal case, a volume hologram can convert a set of input waves into a set of output waves. Unfortunately, this is only true when the incident wave is unperturbed. Because volume holographs are conceptually modeled as interference patterns known, programmed, or even recorded to vary the phase and amplitude of a reference input wave, the output wave is inherently depleted as it passes through the volume. These inefficiencies are compounded even further for large-magnitude index variations. Thus, while holography works well for surface holograms, the practical limitations and inefficiencies associated with volume interference patterns render holographic approaches to volumetric spatial wave conversion inadequate. This disclosure proposes a departure from the traditional holographic approach based on interference patterns.

In its place, volumetric structures are proposed in which finite arrays of conceptually polarizable dipoles are mathematically modeled as functional equivalents to continuous index distributions. The term "symphotic" is used throughout this disclosure to refer to a wide variety of finite-array approximations of continuous index distributions, including those modeled as three-dimensional arrays of discrete dipole values. The term "symphotic pattern" can be used to describe a calculated three-dimensional array of discrete dipole values that functionally approximates a more continuous material or material having a higher order of selectivity. The concept of a "symphotic pattern" may also be applied to a two-dimensional array of conceptually polarizable dipoles that functionally approximates a surface hologram or other surface distribution of index material, but this disclosure focuses primarily on three-dimensional symphotic patterns and the formation of three-dimensional, or volumetric, symphotic structures.

To provide a specific example, a symphotic structure may be formed by depositing, printing, etching, or otherwise manufacturing a physical array of dipole elements having static or dynamically tunable dipole values as specified by a three-dimensional symphotic pattern. The development and calculation of the symphotic pattern may begin with the identification of a continuous refractive index distribution calculated or measured to convert each of a plurality of input reference waves to a corresponding plurality of output object waves. By virtue of converting a plurality of input reference waves to a corresponding plurality of output object waves, it is implied that this continuous refractive index distribution is volumetric and inhomogeneous.

The distribution of dielectric constants and the materials used in the volume may be idealized as a graded-permittivity structure having a continuous distribution of dielectric constants, such that there are no abrupt changes in permittivity across the structure. Assuming finite operational bandwidth, a discretized piecewise-continuous approximation of the graded-permittivity structure may be electromagnetically equivalent.

Accordingly, inhomogeneous continuous refractive index distribution is modeled as a plurality of discretized, homogeneous volumes, referred to as "voxels," that have subwavelength dimensions. An optimization problem attempting to solve for the values and properties of a continuously variable refractive index material may be intractable unless some approximations are made. Even after reducing the number of variables for optimization to a discrete number of homogeneous voxels, solving for the index distribution still amounts to a difficult inverse problem with many variables.

However, by considering a three-dimensional array of discrete dipole values as functionally approximating the subwavelength voxels, the number of unknowns is significantly reduced, and the entire optimization problem can be tractably computed with modest processing resources.

In various embodiments, a symphotic structure to convert electromagnetic input reference waves into output object waves may include a three-dimensional array of discrete dipole elements with subwavelength interelement spacings, and may be practically realized through any of a wide variety of approaches, including, without limitation, through the use of high-dielectric nanoparticles, plasmonic nanoparticles, and other polarizable dipoles that, for a given operational bandwidth, can be configured in an array with subwavelength interelement spacings.

In various embodiments, metamaterial dipoles may be utilized to provide a wide range of synthetic control within specific operational bandwidths. The interacting dipole model serves as the framework for the simulation and optimization of optically large, volumetric structures. The specific materials, dimensions, and reconfigurability may depend on the target functionality.

For example, volumetric acoustic metamaterials can be engineered with a similar approach to those discussed above, but with consideration for bulk modulus and density variables instead of electromagnetic properties of permittivity and the like. For embodiments in which the acoustic waves will ultimately propagate in the air, the optimization analysis can be further restricted to compression waves and make use of a scalar wave equation. Moreover, the acoustic equivalent of the symphotic patterns for electromagnetic embodiments may be expressed as scattered fields of discrete acoustic monopoles, which can be optimized for a desired field structure. With the understanding that acoustic versions of nearly every embodiment are possible, the remainder of this disclosure focuses primarily on electromagnetic embodiments to avoid unnecessary duplication.

One advantage of the symphotic design approach described herein is that by considering a medium of dipoles from the outset, the number of variables for optimization remains easily computable. In fact, as discussed below in greater detail, the optimization problem may be computed sufficiently quickly to allow for locally reconfigurable symphotic structures that can be dynamically tuned in real time.

As previously described, an initial continuous index distribution may be identified as the basis for ultimately calculating the discrete dipole values. The initial continuous index distribution may be identified in a number of ways depending on the target functionality. The traditional interference approach can be used to identify an initial continuous index distribution and is used in the example below with reference to FIGS. 1A-2E.

FIG. 1A illustrates a reference wave 102 and an object wave 104 interfering to create an interference pattern 106.

Figure 1B:
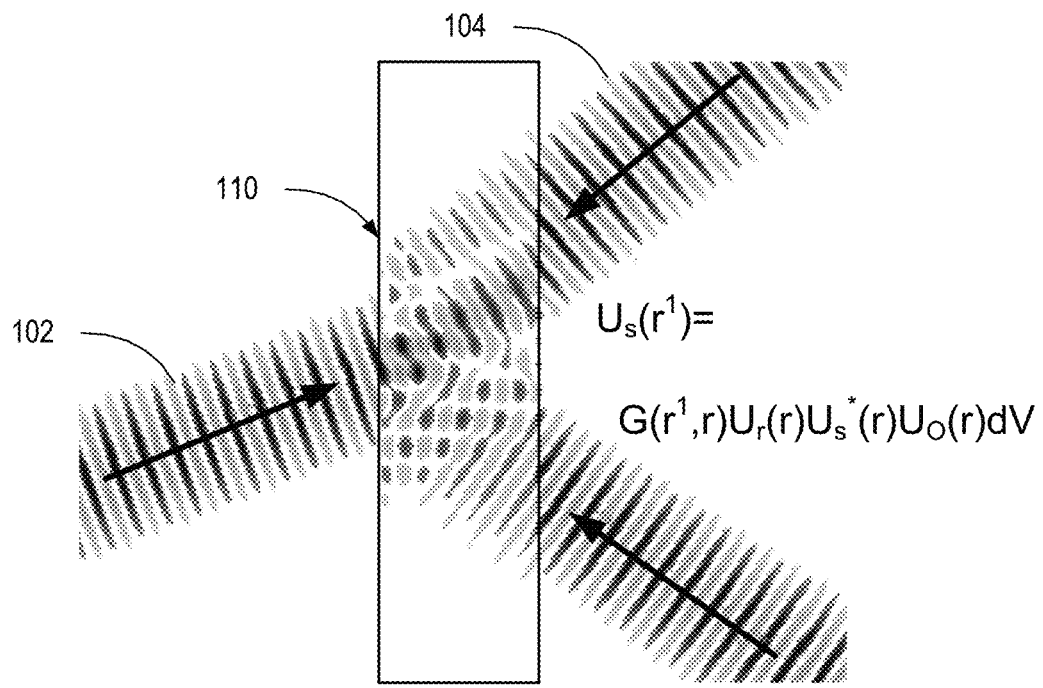
FIG. 1B illustrates the interference pattern in FIG. 1A used as the basis for determining an ideal hologram, according to one embodiment.

FIG. 1B illustrates the interference pattern 106 in FIG. 1A being used as the basis for determining an ideal hologram 110. It is appreciated that this simple approach can be greatly expanded for multiplex volume holograms and could be accomplished via computer simulation or mathematical computation.

FIG. 2A is repetitive of FIGS. 1A and 1B, but is reproduced on the same drawing sheet as FIGS. 2B-2E for continuity and understanding. Specifically, FIG. 2A illustrates a reference wave 202 and an object wave 204 interfering to identify parameters for an ideal hologram 210 that can be subsequently used to convert the reference wave 202 into the object wave 204.

FIG. 2B illustrates ideal hologram 210 as a spatially varying refractive index distribution or variation in other material parameter (e.g., density or bulk modulus for acoustic embodiments).

FIG. 2C illustrates the continuous, inhomogeneous material distribution of the ideal hologram 210 discretized into a plurality of volume sub-elements, or voxels 215, each of which is approximated as a homogeneous material. The workflow in FIGS. 2A-2E shows a two-dimensional representation of the discretization; however, the discretization of the continuous inhomogeneous material 210 into homogeneous voxels 215 occurs in all three dimensions.

Figure 2G:
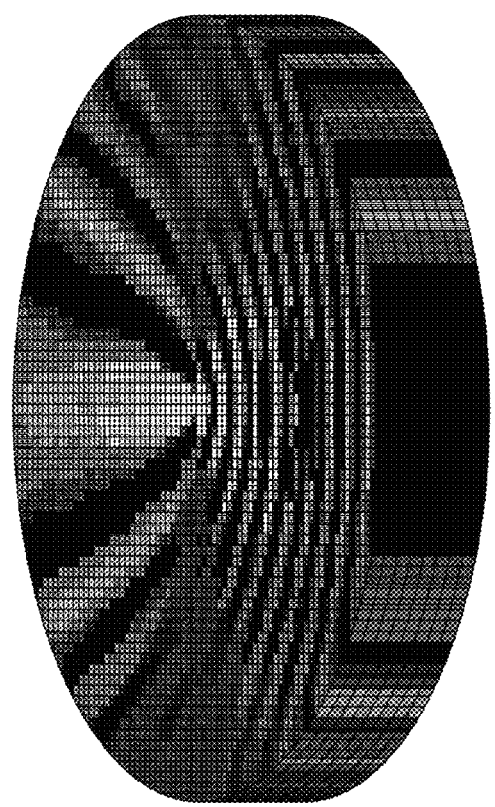
FIG. 2G illustrates the finite aperture ideal hologram modeled as a plurality of subwavelength homogenous voxels, according to one embodiment.
Figure 2F:
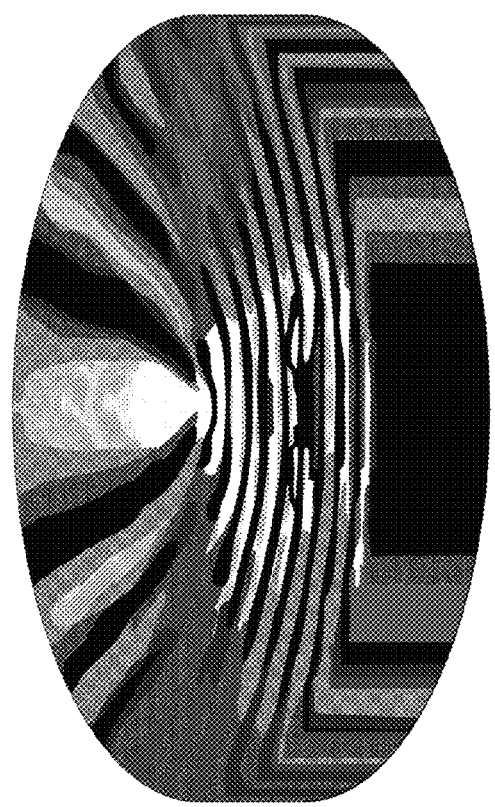
FIG. 2F illustrates a three-dimensional representation of a continuous, inhomogeneous material distribution for a finite aperture ideal hologram.

FIG. 2F illustrates a three-dimensional representation of a continuous, inhomogeneous material distribution for a finite aperture ideal hologram 210.

FIG. 2G illustrates the finite aperture ideal hologram 210 modeled as a plurality of subwavelength voxels 215, each of which voxels is homogenous and collectively approximate the ideal hologram 210. It can be conceptually understood that if the "boxes" representing individual voxels 215 were small enough, FIG. 2G would be visually indistinct from FIG. 2F. In a conceptually analogous way, by modeling the voxels 215 to have subwavelength dimensions for the operational bandwidth, frequencies within that bandwidth will have indistinguishable responses to the continuous inhomogeneous material 210 and plurality of subwavelength voxels 215.

In various embodiments, a combination of voxel shapes and/or sizes may be used. Moreover, voxels may be shaped and/or sized such that little or no space, gaps, or voids exist between voxels. Alternatively, voxels may be arranged such that gaps or voids of various sizes and/or shapes exist intentionally. In some embodiments, the gaps or voids may be ignored and/or negligible in calculating the volumetric dielectric constants. Alternatively, the gaps or voids may be assigned one or more dielectric constants corresponding to a vacuum or to air or another fluid that fills the gaps or voids. In some embodiments, the voxels may be cubes, parallelepipeds, tetrahedrons, prisms, various regular polyhedrons, or other polyhedrons.

The holographic lens may be conceptually discretized to facilitate the use of optimization algorithms, examples of which are described herein and can be found in U.S. patent application Ser. No. 14/638,961 filed on Mar. 4, 2015, titled "Holographic Mode Conversion for Electromagnetic Radiation," which application and all applications that claim priority thereto are hereby incorporated by reference in their entireties.

FIG. 2D illustrates the calculation of a symphotic pattern of dipole values that functionally approximates the volumetric subwavelength voxels 215. Again, FIG. 2D illustrates a single two-dimensional layer of the symphotic pattern of dipole values. The symphotic pattern may be calculated as a three-dimensional array of discrete dipole values. The three-dimensional array of discrete dipole values functionally approximates the plurality of subwavelength voxels 215, which in turn model the continuous refractive index distribution of the ideal hologram 210.

FIG. 2E illustrates the ultimate realization of the symphotic pattern of dipole values as a variety of metamaterial elements and/or dielectric particles of various sizes.

Within the framework of the interacting dipole model, various optimization approaches can be leveraged to improve the functionality, simplify manufacturing, reduce the number of unique dipole elements, or achieve another optimization target. In some embodiments, optimization approaches can leverage advanced machine learning and functional approximation methods.

The individual dipole values for a given symphotic mapping of input waves to output waves is locally computable. Accordingly, a local dynamically reconfigurable volumetric symphotic structure can be created by adding the ability to modify one or more properties of individual dipoles, small groups of dipoles, rows of dipoles, or clusters of dipoles. For example, one or more external voltage controls may be added to a volumetric distribution of magnetic and/or electric dipole elements that allows each dipole element to be individually adjusted. For example, each external control signal may allow for manipulation of the magnitude and/or direction of the dipole moment of one or more of the dipoles. In some embodiments, external control signals may be arranged to provide addressability of individual or groups of dipoles for individual or collective tuning.

Figure 3:
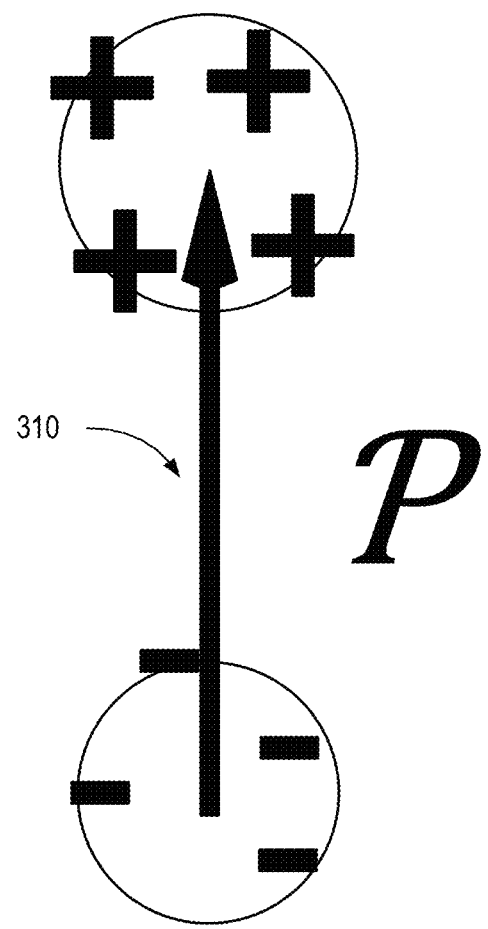
FIG. 3 illustrates a simple model of an electrical dipole with the magnitude and direction of the dipole moment vector represented by an arrow, according to one embodiment.

FIG. 3 illustrates a simple model 300 of an electrical dipole with the magnitude and direction of the dipole moment vector represented by the arrow 310. At low frequencies, electrical dipoles form in any conducting or dielectric particle (e.g. any structure that produces a charge separation in response to applied field). Dipole responses dominate electrically small objects, with respect to wavelength.

Figure 4C:
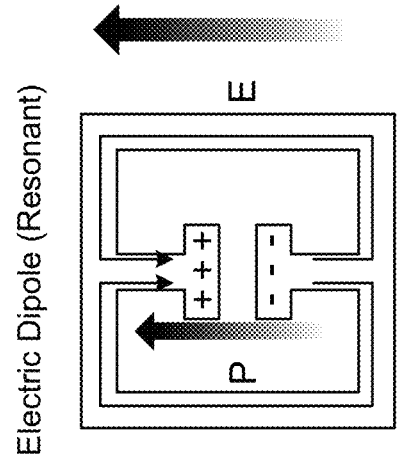
FIG. 4C illustrates a resonant electric inductor-capacitor (ECL) resonator, according to one embodiment.
Figure 4B:
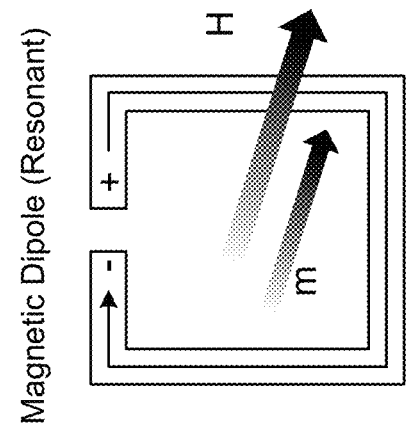
FIG. 4B illustrates an example of a split ring resonator (SRR) magnetic dipole, according to one embodiment.
Figure 4A:
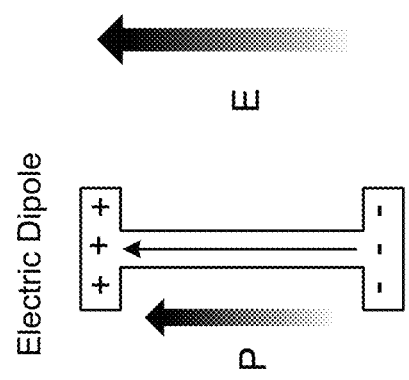
FIG. 4A illustrates a non-resonant electric I-Beam dipole, according to one embodiment.

FIG. 4A illustrates a non-resonant electric I-Beam dipole, according to one embodiment.

FIG. 4B illustrates an example of a split ring resonator (SRR) magnetic dipole, according to one embodiment.

FIG. 4C illustrates a resonant electric inductor-capacitor (ECL) resonator, according to one embodiment.

Figure 5A:
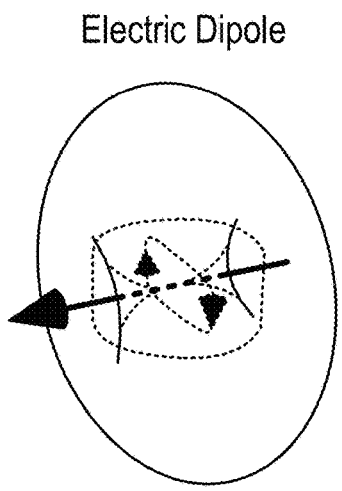
FIG. 5A illustrates a model of a high dielectric nanoparticle exhibiting a Mie as an electric dipole, according to one embodiment.

FIG. 5A illustrates a model of a high dielectric nanoparticle exhibiting a Mie as an electric dipole, according to one embodiment. The legend in FIG. 5B is applicable to FIG. 5A as well.

Figure 5B:
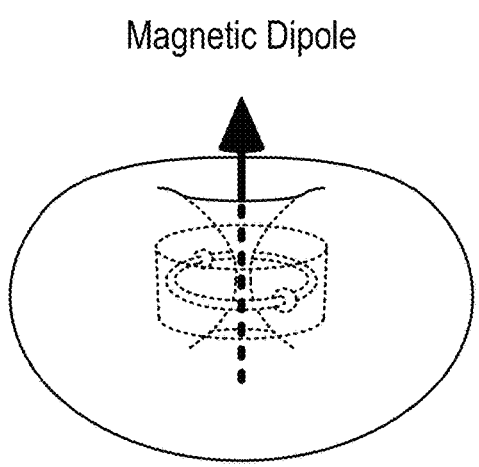
FIG. 5B illustrates a model of a magnetic dipole, according to one embodiment.

FIG. 5B illustrates a model of a magnetic dipole, according to one embodiment.

Figure 5C:
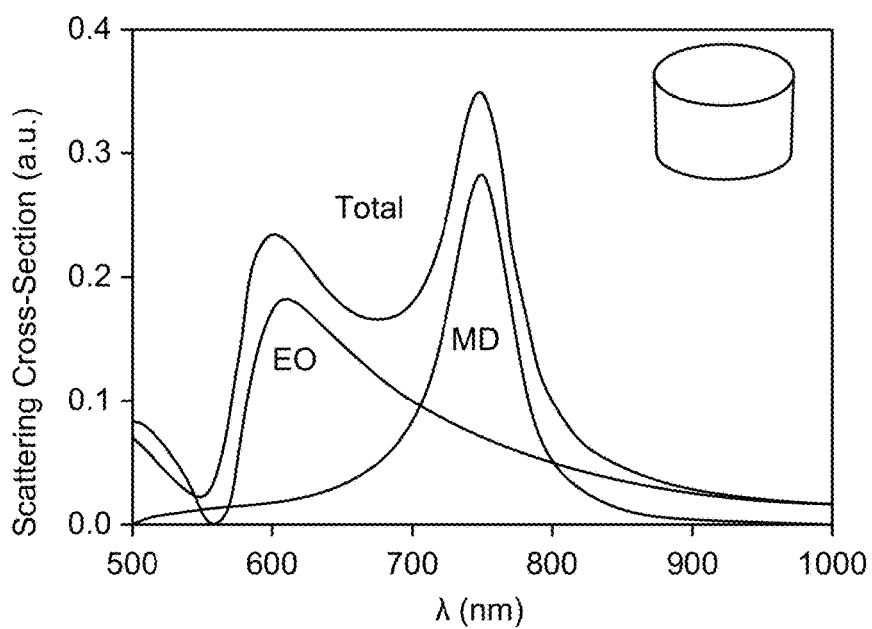
FIG. 5C illustrates the scattering cross-section of the electric and magnetic. High dielectric nanoparticles dipoles, according to one embodiment.

FIG. 5C illustrates the scattering cross-section of the electric and magnetic dipoles at various wavelengths. High dielectric nanoparticles support optical, or Mie, resonances which behave like polarizable electric magnetic dipoles. As illustrated by the scattering at various wavelengths, it can be readily appreciated that such particles may be used in forming the symphotic structure of dipole elements.

FIG. 6 illustrates several materials, spectral ranges, and refractive indices. Each of these materials may be used as part of a symphotic structure, depending on the specific bandwidth and target functionality of the symphotic structure.

The advantages and applications of locally reconfigurable volumetric index materials, especially those utilizing dielectric index materials for operation in optical or quasi-optical bandwidths, are widely recognized and discussed in the context of related fields, such as volumetric holography. The presently described locally reconfigurable symphotic structure functionally approximates true inhomogeneous volumetric index distributions and can therefore provide all the desired functionality for any and/or all of these applications. For example, various embodiments and adaptations of the static and/or reconfigurable symphotic structures described herein may be used as/in/for: dynamic holographic memory, mode-matching devices, imaging, machine vision, physical layer pattern recognition, optical mode conversion, chemical detection, coherence measurements, filtering, interferometry, data storage, multiport storage, multiplexed dense storage, holonomic brain type architectures, neuroscience applications, ultrafast and precise analog-to-digital converters, communication multiports, image processing, signal processing, ultrafast search modes, encryption and security applications, and any other application requiring ultrafast linear processing or parallel processing.

The specific configuration, size, bandwidth, wave conversion, and other properties of symphotic structures may vary based on the intended usage. Regardless of the particular application, a continuous refractive index distribution can be identified to provide for the conversion of a set of input waves to be converted to a set of output waves. As previously noted, a holographic approach based on interference patterns may be used to define the initial volumetric index distribution. In other embodiments, any of the numerous approaches known in the field may be utilized. For example, a linear solution based on a variation approach may be used, as described in Marks, Daniel L. and Smith, David R, 2018, Linear Solutions to Metamaterial Volume Hologram Design Using a Variational Approach, Journal of the Optical Society of America, 35(4):567-76, which publication is hereby incorporated by reference in its entirety.

In many, if not all, practical applications, an identified volumetric index distribution cannot be manufactured as ideally specified. An implementation step is applied to reduce the continuous material distribution to a manufacturable material and/or metamaterial. For example, an ideal holographic design can be expressed as a dielectric function ε(r), and the relationship between the reference field UR(r) and the scattered field US(r) in the first Born approximation is:

$$\nabla^2 US + \varepsilon_0 \omega^2 c^2 US = -(\varepsilon(r) - \varepsilon_0) \omega^2 c^2 UR = -\varepsilon_0 \chi(r)$$
$$\omega^2 c^2 UR = -\omega^2 c^2 P(r) \quad \text{EQ. 1}$$

In EQ. 1, ε0 is the permittivity of free space, ε(r) is the spatially varying dielectric function of the material, c is the speed of light in vacuum, and ω is the angular frequency of the wave. The permittivity can be expressed in terms of the medium susceptibility, χ(r), which—when multiplied by the reference field—can be written as a continuous polarization field, P(r).

The example provided herein assumes that the waves are scalar, but the algorithms can be readily extended to vectorial formulations as would be applicable to various embodiments of the systems and methods described herein. Sampling the material at discrete points and using the free space propagator, the scattered field in terms of the reference field (up to a constant) can be expressed as:

$$US(ri) = \Sigma G(r'i,rj) P j j = \Sigma G(r'i,rj) p j V j = \Sigma G(r'i,rj) \alpha j V U R (rj) j \quad \text{EQ. 2}$$

The free space propagator has the form $G(e'i,rj) \sim \exp(ik0|r'i-rj|)/|r'i-rj|$. Here, the continuous polarizability function has been transformed to point dipoles, each with a polarizability αj. EQ. 2 expresses the scattered field as a sum of dipole (j) contributions. Each dipole moment is determined by the polarizability, αj, multiplied by the reference field at the location, rj. Consistent with the homogenous voxel modeling shown in FIG. 2C, the local dielectric function is a constant over each local volume. Accordingly, the polarizability is represented by VPj. Values for the αj can be determined quite accurately using, for example, effective medium theory. However, the dipole interactions can be self-consistently taken into account, and the local dipole moments can be found to a better approximation using an improved form of the discrete dipole approximation as follows:

$$\alpha i - 1 \Sigma [\delta ij - \alpha i G(ri,rj)] p j = UR(ri) \quad \text{EQ. 3}$$

The dipole moments identified using EQ. 3 can be used with Eq. 2 to calculate a more accurate approximation to the scattered field for dipole-based functional approximations. Any of a wide variety of optimization, functional approximation, and machine learning techniques may utilize a form, model, or similariton of EQ. 2 to improve on an initial volumetric index distribution. The optimization systems and algorithms may be designed to improve the accuracy of the mapping of input reference waves to output object waves, improve operational efficiency, and/or reduce the complexity of manufacturing.

The optimizations may be specifically configured to optimize for dipole-based functional approximations of volumetric index distributions initially identified using, for example, holographic interference techniques, coupled mode theory, and/or linear or multiplex variational approaches. The set of polarizabilities can be used as optimization variables and altered to achieve the best values for a target set of input and output waves. The systems and methods described herein facilitate large-scale optimization, which serves as the basis for a comprehensive volumetric design approach with a reduced solution space.

In various embodiments, advancements in machine learning can be leveraged to improve the initial design and/or formation of a symphotic structure. In other embodiments, machine learning techniques can be used for manipulating control signals of dynamically reconfigurable symphotic structures.

A three-dimensional array of dipole elements may be formed (e.g., manufactured, printed, etched, etc.) for microwave and millimeter wave frequencies using a wide variety of available resonant and non-resonant dipoles, including various metamaterial dipoles such as the I-beam, SSR and ELC dipoles exemplified in FIGS. 4A-C.

Figure 7B:
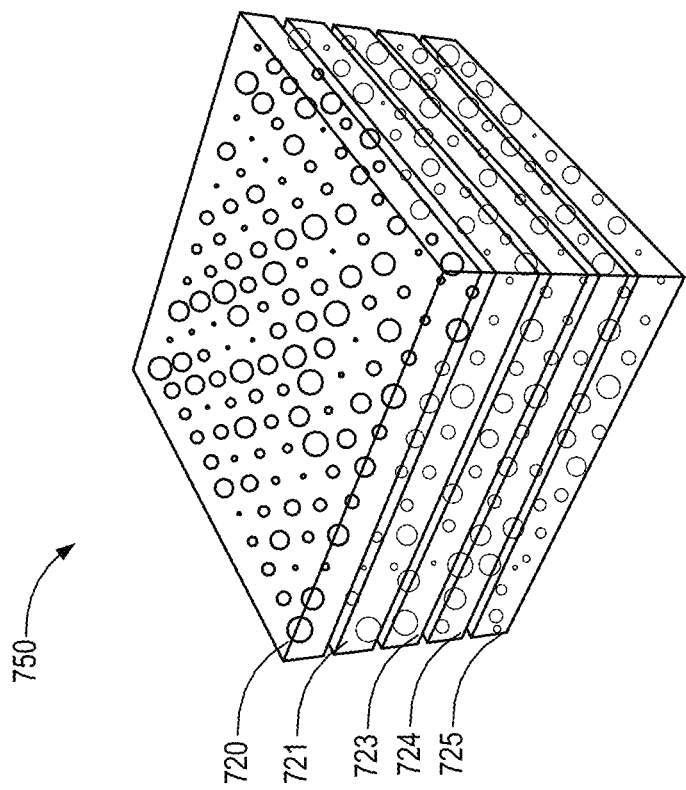
FIG. 7B illustrates a symphotic structure formed via a multi-layer manufacturing approach for infrared and visible wavelength operation, according to one embodiment.
Figure 7A:
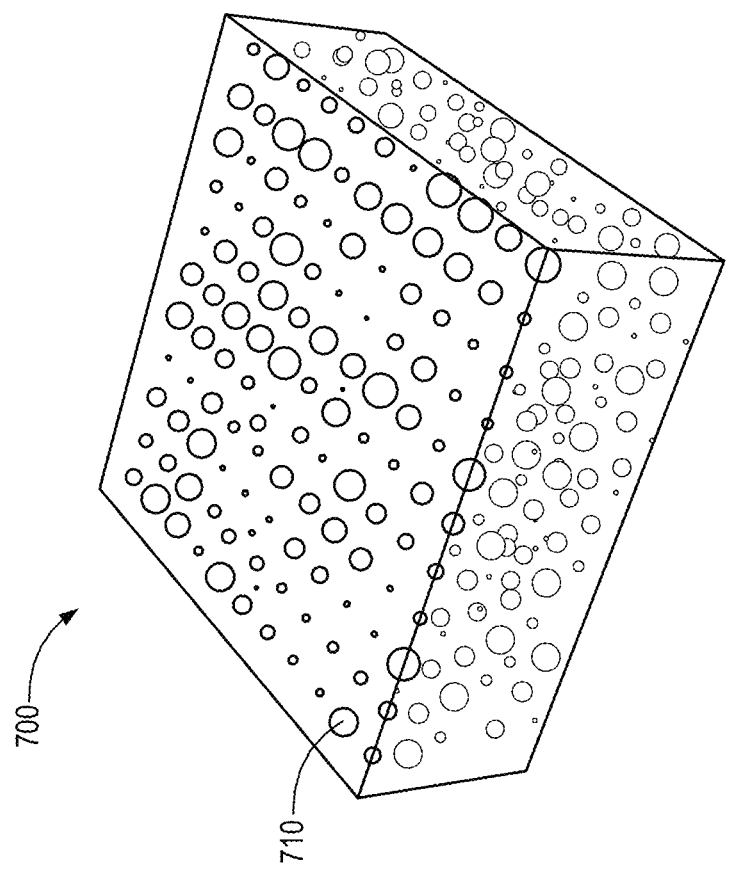
FIG. 7A illustrates several materials that can be used to fabricate symphotic structures, spectral ranges, and refractive indices, according to one embodiment.

FIG. 7A illustrates a symphotic structure 700 formed as a three-dimensional array of high-dielectric sphere dipole elements 710. The dipole elements 710 may have various dipole values, such as dipole moments, that are represented by the different-sized spheres. The dipole elements 710 are maintained in the three-dimensional array by a low dielectric host material.

FIG. 7B illustrates a symphotic structure 750 (potentially a functional equivalent of symphotic structure 700 in FIG. 7A) formed via a multi-layer 720-725 manufacturing approach. At infrared and visible wavelengths, dielectric resonators, such as the spheres illustrated in FIGS. 7A and 7B, may be selected to form the symphotic structure because they provide a strong scattering response with minimal resistive losses. Symphotic structures may be formed using layer stacking, three-dimensional printing, etc.

A variety of high dielectric materials with varying properties can be used for optical metamaterials, including $TiO_2$, GaP, Te, PbTe, SiC and many others that can be extremely low-loss over specific bands in the visible or infrared range. Using dielectric particles or various metamaterial elements, the intrinsic polarizability can be determined by computing the scattering coefficients for a single, infinitely periodic lattice of identical elements, and then applying an effective medium theory.

Figure 8:
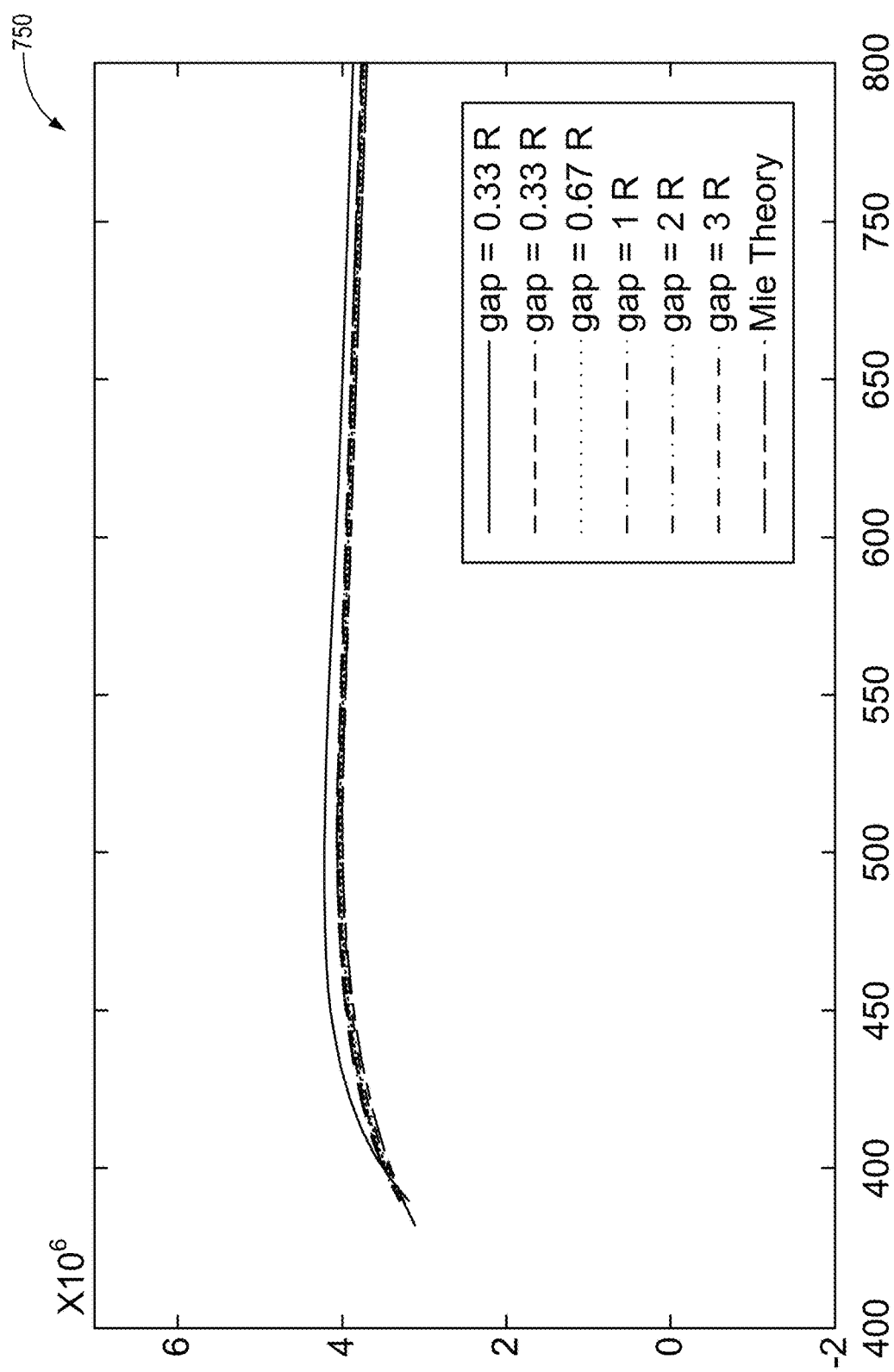
FIG. 8 illustrates a graph of dielectric $TiO_2$ spheres with a 75 nm radius to show that, with large distances, the extracted polarizability conforms to a single sphere using Mie theory, according to one embodiment.

In FIG. 8, dielectric $TiO_2$ spheres with a 75-nm radius are graphed 750 to show that if distance between the spheres is large enough (>0.1 x the radius), the extracted polarizability agrees with that of a single sphere using Mie theory. Using polarizability extraction, an equivalent and accurate dipole description of a collection of metamaterial elements can be applied and used as a computational tool for largescale iterative optimization cycles.

Another advantage of the symphotic approaches described herein is that the dipole formalism is compatible with parallelization, so that graphic processing units (GPUs) can be leveraged for fast and efficient modeling.

In some embodiments and applications, the overall size of the symphotic structure may be suitable for various emerging fabrication techniques, such as planar fabrication methods combined with stacking and multilayer metamaterial structures. Similarly, techniques such as planar optics for infrared bands and techniques for addressing issues of alignment and integration may also facilitate the formation of symphotic structures. The planar fabrication technique may facilitate the formation of reconfigurable symphotic structures because of the electrical lead structures that facilitate the application of tunable bias voltages or other stimuli. Many of these structures can be fabricated on low dielectric substrates (with transparent leads for reconfigurable samples), then bonded together to form the final symphotic structure.

Figure 9:
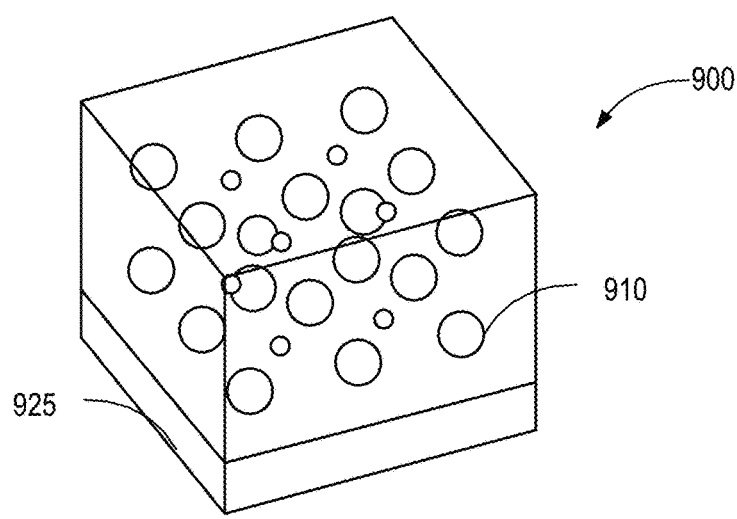
FIG. 9 illustrates a symphotic structure formed as a three-dimensional array of high-dielectric sphere dipole elements according to one embodiment.

FIG. 9 illustrates a symphotic structure 900 formed as a three-dimensional array of high-dielectric sphere dipole elements 910. The dipole elements 910 may have various dipole moments, that are represented by the different size spheres. The dipole elements 910 are maintained in the three-dimensional array by a low dielectric host material manufactured on top of a substrate 925.

Figure 10:
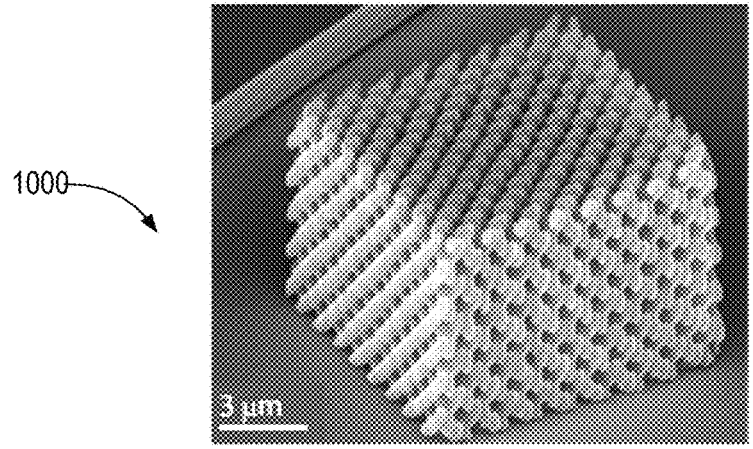
FIG. 10 illustrates a well-aligned structure demonstrating the feasibility of manufacturing small-scale dipole elements in a highly accurate matrix, according to one embodiment.

FIG. 10 illustrates a well-aligned structure 1000 demonstrating the feasibility of manufacturing small-scale dipole elements in a highly accurate matrix, according to one embodiment.

Reconfigurable symphotic structures may be formed using components like SRRs, ELCs, and the like that are loaded with PIN diodes, varactors, or other tunable or variable-bias type devices. In some embodiments, liquid crystal may be employed to dynamically affect the polarization values of one or more dipole elements in a three-dimensional array of dipole elements.

Figure 11:
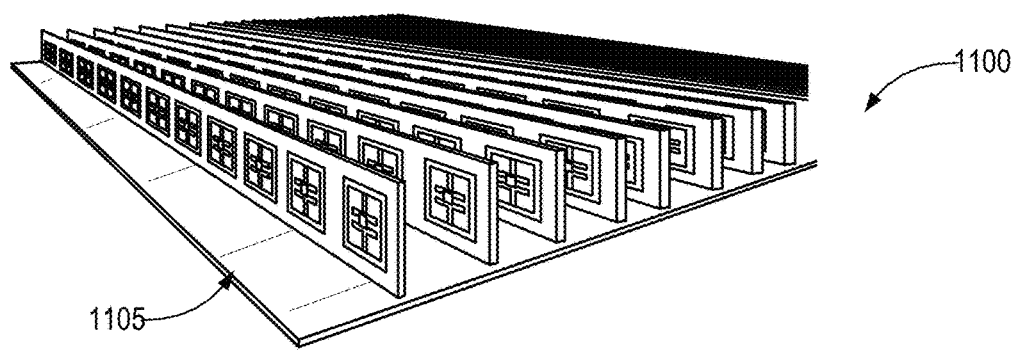
FIG. 11 illustrates an array of metamaterial elements as polarizable dipoles to form a symphotic structure with bias lines that can be used to modify one or more dipole values to reconfigure the symphotic structure, according to one embodiment.

FIG. 11 illustrates an array of metamaterial elements 1100 as polarizable dipoles to form a symphotic structure with bias lines 1105 that can be used to modify one or more dipole values to reconfigure the symphotic structure. The illustrated embodiment is suitable for operation in microwave bandwidths and may include varactor-loaded metamaterial resonators driven by the bias lines.

As previously noted, although the mathematical equations and specific examples above were generally described in the context of electromagnetic radiation embodiments utilizing electrical and/or magnetic dipoles, it is appreciated that volumetric acoustic metamaterials can be engineered with a similar design approach to modify pressure fields of, for example, ultrasonic or audible compression waves.

Figure 12:
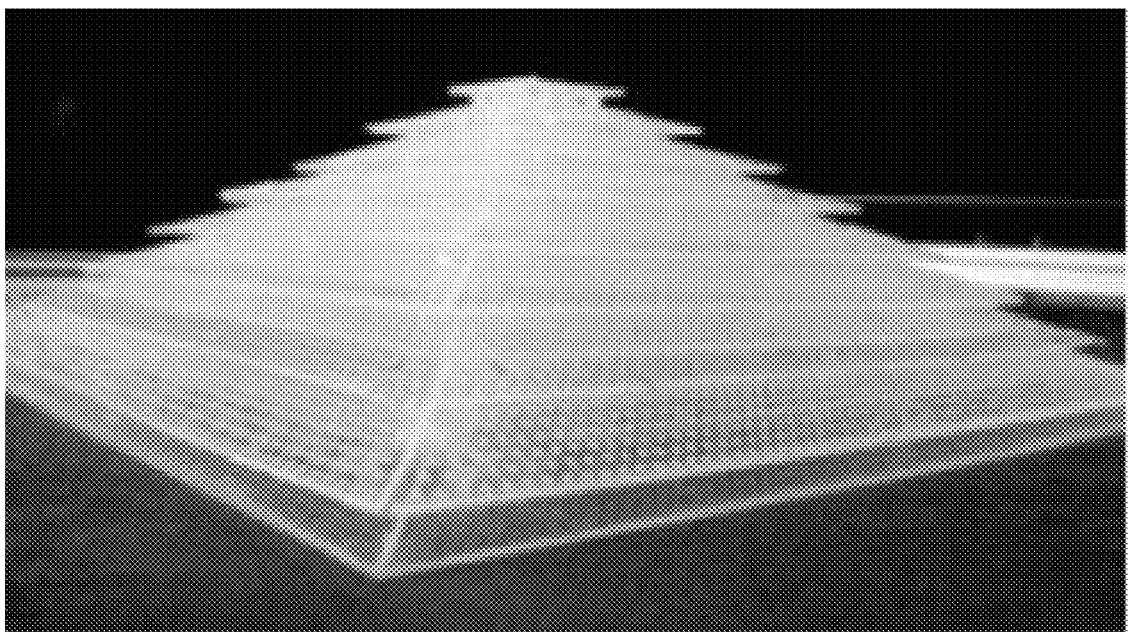
FIG. 12 illustrates a characteristic example of an acoustic metamaterial utilized to make a ground cloak.

FIG. 12 illustrates a characteristic example of an acoustic metamaterial utilized to make a ground cloak. In some acoustic embodiments, the initial volumetric index distribution may be specified as a distribution of acoustic materials with various acoustic properties, such as linear and dynamic density tensor properties, bulk modulus, elastic modulus, density, or other acoustic property. An initial volumetric distribution of acoustic refractive indices may be found to satisfy the following expression:

$$n^2(x,y,z) - 1 = C p_{in} \cdot p_{goal} / |p_{goal}|^2 \qquad \text{EQ. 4}$$

Where $n(x,y,z)$ is the volumetric distribution of acoustic refractive indices, is a selectable normalization constant, $P_{in}$ is the input acoustic pressure field distribution, $p_{goal}$ is the output pressure field distribution.

In various embodiments, acoustic symphotic structures may be based on acoustic dipole and/or monopole responses. Some embodiments may utilize tunable acoustic metamaterials, such as piezoelectric components, to allow for dynamic reconfigurability.

Any of a wide variety of materials and methods of manufacturing may be employed. For example, a symphotic structure may be manufactured, at least in part, using glass-forming materials, polymers, metamaterials, aperiodic photonic crystals, silica, composite metamaterials, porous materials, foam materials, layered composite materials, stratified composite materials, fiber-bundle materials, micro-rod materials, nano-rod materials, a non-superluminal low-loss dielectric material, porcelain, glass, plastic, air, nitrogen, sulfur hexafluoride, parylene, mineral oil, ceramic, paper, mica, polyethylene, and/or aluminum oxide.

A symphotic structure may be used as a distributed storage, an optical lens, an acoustic converter, and a three-dimensional imaging device. A symphotic structure may be configured for use as one of: a hyperspectral imaging device, encryption algorithms, machine vision, distributed learning, and chemical detection. A symphotic structure may be used as an imaging sensor to receive the output object waves as processed image information, convert electromagnetic input reference waves to electromagnetic output object waves, convert optical input reference waves to optical output object waves, convert infrared input reference waves to infrared output object waves, and/or to convert visible light input reference waves to visible light output object waves.

The symphotic structures may be configured for operation with RF, microwaves, terahertz, millimeter-waves, acoustic output waves, and/or ultrasonic waves. The symphotic structures may be configured to upconvert or downconvert the frequency of reference waves. The symphotic structures may be configured to convert audible input reference waves to audible output object waves, convert audible input reference waves from first and second audio channels to audible output object waves directed to different spatial locations, and/or convert acoustic input reference waves from each of a plurality of audio channels to audible output object waves that are spatially localized and fully isolated from one another.

A symphotic structure may include dipole structures configured to output a unique object wave for each unique frequency of input wave, each unique angle of incidence of input wave, and/or each unique angle of incidence and frequency of input wave. A symphotic structure may have a static value to provide for a static conversion of input reference waves to output object waves or include control signals to dynamically tune at least some of the dipole structures. The control signals may be coupled to one of a varactor and a PIN diode, useable to select a polarization value of each dipole structure.

Some of the dipole elements are tunable by one or more of electrically controllable liquid crystals, varactors, PIN diodes, MEMs, ferroelectrics, physical deformation, and mechanical actuation. At least some of the dipole structures may comprise electric I-beam LC dipole elements or be tuned via elements having a capacitance and an inductance. At least some of the dipole structures may comprise metamaterial electric I-beam LC dipole elements.

A symphotic structure may comprise magnetic resonators for converting electromagnetic input reference waves to electromagnetic output object waves, such as split ring resonators (SRRs) and electric inductor-capacitor resonators (ELCs). The dipole structures comprise metamaterial dielectric resonators for conversion of optical electromagnetic input reference waves to optical electromagnetic output object waves. The metamaterial dielectric resonators may comprise nanoparticles with fixed Mie resonances, nanoparticles with tunable Mie resonances, and/or a set of metamaterial dielectric spheres in a three-dimensional array.

The metamaterial dielectric spheres in the three-dimensional array may be set within a lower dielectric host background. The metamaterial dielectric resonators may comprise one or more of: $TiO_2$, GaP, Te, PbTe, and SiC.

Intrinsic polarizability of the metamaterial dielectric resonators may be computed based on an effective medium theory of scattering coefficients of a single, infinitely periodic lattice of identical elements. At least some of the dipole structures may comprise dielectric resonators for conversion of optical electromagnetic input reference waves to optical electromagnetic output object waves. The dielectric resonators may comprise nanoparticles with fixed Mie resonances, nanoparticles with tunable Mie resonances, and/or a set of dielectric spheres in a three-dimensional array. The dielectric spheres in the three-dimensional array may be set within a lower dielectric host background.

A symphotic structure may have dipole structures configured to convert M unique input reference waves to N unique output object waves, where M and N are positive integers, wherein M is equal to N, M is greater than N, or M is smaller than N.

A symphotic structure may include an array of varactor-loaded resonators in communication with the dipole structures and bias lines for driving the varactors for dynamic reconfiguration of the three-dimensional array. The varactor-loaded resonators may be embodied as metamaterials.

Many existing computing devices and infrastructures may be used in combination with the presently described systems and methods. Some of the infrastructure that can be used with embodiments disclosed herein is already available, such as general-purpose computers, computer programming tools and techniques, digital storage media, and communication links. A computing device or controller may include a processor, such as a microprocessor, a microcontroller, logic circuitry, or the like. A processor may include one ore more special-purpose processing devices, such as application-specific integrated circuits (ASICs), programmable array logic (PAL), programmable logic array (PLA), programmable logic device (PLD), field-programmable gate array (FPGA), or other customizable and/or programmable device. The computing device may also include a machine-readable storage device, such as non-volatile memory, static RAM, dynamic RAM, ROM, CD-ROM, disk, tape, magnetic, optical, flash memory, or another machine-readable storage medium. Various aspects of certain embodiments may be implemented using hardware, software, firmware, or a combination thereof.

The components of the disclosed embodiments, as generally described and illustrated in the figures herein, could be arranged and designed in a wide variety of different configurations. Furthermore, the features, structures, and operations associated with one embodiment may be applied to or combined with the features, structures, or operations described in conjunction with another embodiment. In many instances, well-known structures, materials, or operations are not shown or described in detail in order to avoid obscuring aspects of this disclosure.

The embodiments of the systems and methods provided within this disclosure are not intended to limit the scope of the disclosure but are merely representative of possible embodiments. In addition, the steps of a method do not necessarily need to be executed in any specific order, or even sequentially, nor do the steps need to be executed only once.

This disclosure has been made with reference to various exemplary embodiments, including the best mode. However, those skilled in the art will recognize that changes and modifications may be made to the exemplary embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element. This disclosure should, therefore, be determined to encompass at least the following claims.

What is claimed is:

1. A structure, comprising:
   a transmissive filled volume with a three-dimensional volumetric distribution of dipole structures distributed throughout the volume with interelement spacings in all three dimensions less than one-half of the smallest wavelength of an operational bandwidth,
   wherein a dipole value of each dipole structure is selected for the volumetric distribution to approximate a continuous refractive index distribution within the volume to convert a plurality of input reference waves passing through the volume to a target plurality of output object waves.

2. The structure of claim 1 configured for use as one of: a distributed storage, an optical lens, an acoustic converter, and a three-dimensional imaging device.

3. The structure of claim 1 configured for use as one of: a hyperspectral imaging device, encryption algorithms, machine vision, distributed learning, and chemical detection.

4. The structure of claim 1, further comprising an imaging sensor to receive the output object waves as processed image information.

5. The structure of claim 1, wherein the dipole structures are configured to convert electromagnetic input reference waves to electromagnetic output object waves.

6. The structure of claim 1, wherein the dipole value of each dipole structure that functionally approximates the continuous refractive index distribution is calculated as an ideal holographic design based on a solution to a dielectric function $\varepsilon(r)$ in terms of the relationship between reference field $U_R(r)$ and scattered field $U_S(r)$ such that: $\nabla^2 U_S + \varepsilon_0 \omega^2 c^2 U_S = -(\varepsilon(r) - \varepsilon_0)\omega^2 c^2 U_R$, where $\omega$ corresponds to the frequency, c corresponds to the speed of light, and where $\varepsilon_0$ corresponds to the permittivity of free space.

7. The structure of claim 1, wherein the volumetric distribution of dipole structures is calculated using a continuous polarization field P(r), based on a Born approximation of the dielectric function $\varepsilon(r)$, such that:

$$\nabla^2 U_S + \varepsilon_0 \frac{\omega^2}{c^2} U_S = -(\varepsilon(r) - \varepsilon_0)\frac{\omega^2}{c^2} U_R = -\frac{\omega^2}{c^2} P(r).$$

8. The structure of claim 1, wherein at least some of the dipole structures comprise metamaterial dielectric resonators for conversion of optical electromagnetic input reference waves to optical electromagnetic output object waves.

9. The structure of claim 1, wherein the continuous refractive index distribution comprises a continuous distribution of permittivity values.

10. The structure of claim 1, wherein the transmissive filled volume comprises a homogeneous material distribution with the three-dimensional volumetric distribution of dipole structures.

11. The structure of claim 1, wherein the transmissive filled volume includes the three-dimensional volumetric distribution of dipole structures distributed throughout the volume with a distribution of voids between at least some adjacent dipole structures.

12. A reconfigurable structure, comprising:
   a transmissive filled volume with a three-dimensional volumetric distribution of dipole structures distributed throughout the volume with interelement spacings in all three dimensions less than one-half of the smallest wavelength of an operational bandwidth;

a plurality of control signals for adjusting the dipole values of the dipole structures; and a controller for controlling the plurality of control signals to select a set of dipole values of the volumetric distribution of dipole structures to approximate a continuous refractive index distribution within the volume to convert a plurality of input reference waves passing through the volume to a target plurality of output object waves.

13. The structure of claim 12, wherein each of the plurality of input reference waves is defined in terms of frequency, and wherein the dipole structures are configured to output a unique object wave for each unique frequency of input reference wave.

14. The structure of claim 12, wherein each of the plurality of input reference waves is defined in terms of angle of incidence, and wherein each of the dipole structures is configured to output a unique object wave for each unique angle of incidence of input reference wave.

15. The structure of claim 12, wherein each of the plurality of input reference waves is defined in terms of frequency and angle of incidence, and wherein the dipole structures are configured to output a unique object wave for each unique angle of incidence and frequency of input reference wave.

16. The structure of claim 12, wherein at least some of the dipole structures comprise dielectric resonators for conversion of optical electromagnetic input reference waves to optical electromagnetic output object waves.

17. The structure of claim 16, wherein the dielectric resonators comprise a set of dielectric spheres in a three-dimensional array.

18. The structure of claim 16, wherein intrinsic polarizabilities of the dielectric resonators are computed based on an effective medium theory of scattering coefficients of a single, infinitely periodic lattice of identical elements.

19. The reconfigurable structure of claim 12, wherein the continuous refractive index distribution comprises a continuous distribution of permittivity values.

20. The reconfigurable structure of claim 12, wherein the transmissive filled volume comprises an inhomogeneous material distribution with the three-dimensional volumetric distribution of dipole structures.

21. The reconfigurable structure of claim 12, wherein the transmissive filled volume includes the three-dimensional volumetric distribution of dipole structures distributed throughout the volume with a distribution of voids between at least some adjacent dipole structures.

* * * * *